US006972160B2

(12) United States Patent
Okada et al.

(10) Patent No.: US 6,972,160 B2
(45) Date of Patent: Dec. 6, 2005

(54) FUEL CELL

(75) Inventors: Tatsuhiro Okada, Tsukuba (JP); Kentaro Ishida, Tsukuba (JP); Masayoshi Ishida, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/309,005

(22) Filed: Dec. 4, 2002

(65) Prior Publication Data

US 2003/0190514 A1 Oct. 9, 2003

(30) Foreign Application Priority Data

Apr. 8, 2002 (JP) ............................ 2002-104642

(51) Int. Cl.[7] ................................................ H01M 8/10
(52) U.S. Cl. ............................ 429/31; 429/42; 429/34
(58) Field of Search ............................ 429/31, 30, 33, 429/44, 40, 42, 34; 422/312; 428/188

(56) References Cited

U.S. PATENT DOCUMENTS

| | | | | |
|---|---|---|---|---|
| 5,458,989 A * | 10/1995 | Dodge | ......................... | 429/31 |
| 6,001,500 A * | 12/1999 | Bass et al. | ..................... | 429/31 |
| 2002/0122968 A1 * | 9/2002 | Okada et al. | ................. | 429/31 |
| 2004/0202913 A1 * | 10/2004 | Kim | ............................ | 429/33 |

FOREIGN PATENT DOCUMENTS

| | | |
|---|---|---|
| JP | 7-296840 A | 11/1995 |
| JP | 9-223507 A | 8/1997 |
| JP | 10-64572 A | 3/1998 |
| JP | 2000-285933 A | 10/2000 |
| JP | 2001-229933 A | 8/2001 |
| JP | 2001-283865 A | 10/2001 |
| JP | 2001-313047 A | 11/2001 |
| JP | 2002-280013 A | 9/2002 |
| JP | 2002-539587 A | 11/2002 |
| JP | 2003-17072 A | 1/2003 |
| WO | WO 00/54358 A1 | 9/2000 |

OTHER PUBLICATIONS

Lecture Synopses of the $69_{th}$ Meeting of the Electrochemical Society of Japan, Mar. 25, 2002, (cover page, pp. 2, 7, 81 and colophon).
Open a road for a portable-use fuel cell using tubular fiber membrane, Apr. 2002, Trigger, cover page and pp. 32-33.
Tube type fuel cell, Dec. 11, 2001, Nikkei Sangyo Shimbun, p. 9.
Paul Sharke; Mechanical Engineering, pp. 58-61, Feb. 2000.

* cited by examiner

*Primary Examiner*—Raymond Alejandro
(74) *Attorney, Agent, or Firm*—Birch, Stewart, Kolasch & Birch, LLP

(57) ABSTRACT

A fuel cell, which has a tubular polymer electrolyte membrane, with a fuel electrode on one of inner and outer sides of the membrane, and with an air electrode on the other side of the membrane, wherein at least one of the fuel electrode and the air electrode is composed of carbon fibers on which a catalyst is loaded.

9 Claims, 3 Drawing Sheets

FUEL CELL

FIELD OF THE INVENTION

The present invention relates to a low-temperature operating-type fuel cell using a tubular polymer electrolyte membrane.

BACKGROUND OF THE INVENTION

Fuel cells include low-temperature operating-type fuel cells, which operate at an operating temperature of as low as 300° C. or less, such as polymer electrolyte fuel cells, alkali fuel cells, phosphoric acid fuel cells, and direct methanol fuel cells. Of those, in particular, those having a polymer membrane as an electrolyte, such as the polymer electrolyte fuel cell and the direct methanol fuel cell, have a number of merits because the electrolyte is not a liquid. For example, if a pressure difference is caused between fuel gas and oxidizer gas (air or oxygen), the fuel cell is run with no problem. In addition, by setting the thickness of the electrolyte membrane to several tens of micrometers or less, improvement in output power, compactness, and stacking capability can be achieved at the same time. Further, the fuel cell is excellent in starting characteristics and load responsiveness. Accordingly, application of such fuel cells to an oncoming electric automobile or domestic stationary power source has recently been receiving attention.

Furthermore, in other application fields than those described above, application of a fuel cell as a small cell (battery), such as one in a portable device or a transportable power source, is gaining a promising feature. Since a fuel cell can generate power instantaneously as soon as a fuel is supplied, it can reduce time required for charging and is sufficiently competitive in cost, as compared with a secondary battery.

A conventional fuel cell is configured such that catalyst layers serving as a fuel electrode and an air electrode (oxygen electrode), respectively, are arranged on both sides of an electrolyte (flat sheet or flat membrane), and further carbon- or metal-made separator components (materials) each furnished with channels for flowing fuel gas and air (oxygen gas) are provided so as to sandwich the catalyst layers, to form a unit that is called a single-cell. A separator is inserted between any adjacent two cells. The separator prevents mixing of fuel (e.g. hydrogen) that flows into the fuel electrode and air (or oxygen) that flows into the air electrode when cells are stacked, and at the same time, the separator functions as an electronic conductor for coupling two cells in series. By stacking a necessary number of such single-cells, a fuel cell stack is assembled, and this is further integrated with apparatuses for feeding fuel gas and oxidizer gas, a control device, and the like, to fabricate a fuel cell, by use of which power generation is performed.

However, although such a flat-type fuel cell construction is suitable for a design of stacking a number of electrodes (fuel electrode and air electrode) having large areas, it has a great disadvantage that it cannot respond to the requirement of miniaturization (making it small in size).

Recently, the design of a fuel cell has been proposed in which only flat-type single-cells are arranged in parallel. In such a case, it is easy to fabricate a small chip and it may have some merits depending on the shape of a small apparatus in which the cell is incorporated. However, it cannot flexibly accommodate the shapes of various small apparatuses. In particular, the problem as to how to seal the fuel electrode in order to prevent the leakage of fuel remains to be solved.

SUMMARY OF THE INVENTION

The present invention resides in a fuel cell, which comprises a tubular polymer electrolyte membrane, with a fuel electrode on one of inner and outer sides of the membrane, and with an air electrode on the other side of the membrane, wherein at least one of the fuel electrode and the air electrode is composed of carbon fibers on which a catalyst is loaded.

Other and further features and advantages of the invention will appear more fully from the following description, take in connection with the accompanying drawings.

BRIEF DESCRIPTION OF THE DRAWINGS

FIG. 3(*b*) is a graph illustrating current-power characteristics of the fuel cell mentioned on FIG. 3(*a*).

FIG. 4(*b*) is a graph illustrating current-power characteristics of the fuel cell mentioned on FIG. 4(*a*).

DETAILED DESCRIPTION OF THE INVENTION

According to the present invention, there are provided the following means:

(1) A fuel cell, comprising a tubular polymer electrolyte membrane, with a fuel electrode on one of inner and outer sides of the membrane, and with an air electrode on the other side of the membrane, wherein at least one of the fuel electrode and the air electrode is composed of carbon fibers on which a catalyst is loaded;

(2) The fuel cell according to the above-mentioned item (1), wherein the carbon fibers loaded with a catalyst are hot-pressed (heat-bonded) to the tubular polymer electrolyte membrane;

(3) The fuel cell according to the above-mentioned item (1), wherein the carbon fibers loaded with a catalyst are coated onto a surface of the tubular polymer electrolyte membrane;

(4) The fuel cell according to the above-mentioned item (1), wherein the carbon fibers loaded with a catalyst being preliminarily woven or unwoven into a fabric and made into a cylindrical form are incorporated (e.g. woven or unwoven) into a surface of the tubular polymer electrolyte membrane; and (5) The fuel cell according to any one of the items (1) to (4) above, wherein the fuel cell is utilized as a power source of a portable device.

As a result of extensive studies, the inventors of the present invention have found that a fuel cell that has excellent productivity and is easy to miniaturize can be obtained as follows. That is, a polymer electrolyte membrane that has conventionally been stacked one on another into a flat plate form is formed in a tubular (hollow) form and then used. Furthermore, carbon fibers loaded with a catalyst are arranged on the inner side (wall surface) and/or outer side (wall surface) of the tube so as to serve either as a fuel electrode or an air electrode, respectively. Forming the fuel cell construction as above makes it possible to easily keep gas tightness of the fuel electrode, provides good catalyst loading property and has excellent flexibility in shape when assembling a stack, and in addition can realize high cell output power.

The present invention has been made based on such a finding.

A preferable embodiment of the fuel cell of the present invention will be explained with reference to the accompanying drawings.

Figure 1:
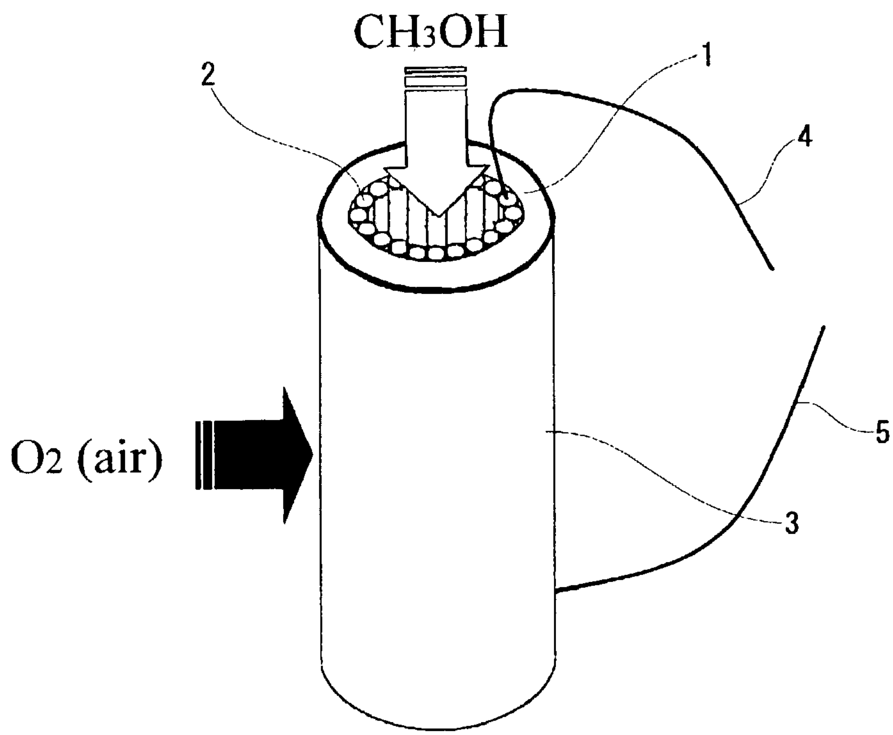
FIG. 1 is a perspective view showing one example of the fuel cell using a liquid fuel, according to the present invention.

FIG. 1 shows one embodiment of a direct methanol fuel cell that embodies one example of the present invention, in which a carbon fiber loaded with a platinum-ruthenium alloy (e.g. atomic composition, 50:50) is incorporated into the fuel electrode.

Reference numeral 1 designates a tubular membrane made of a perfluorosulfonic acid-type polymer electrolyte, and on an inside of the tube is filled a carbon fiber 2 loaded with a platinum-ruthenium alloy (e.g. atomic composition, 50:50) as a catalyst. The cavity of the tube is filled with 1.0 M sulfuric acid and a 3-M methanol solution. With this structure, the inside of the tubular membrane constitutes a fuel electrode. On the outer side of the tubular membrane, are deposited platinum particles, which are fixed thereto, by a chemical plating method, to form a layer 3 which constitutes an air electrode (oxygen electrode), and which contacts outside air. Reference numerals 4 and 5 designate external terminals connected to the catalyst layers on the inner side and outer side of the tube, respectively, and corresponding to the output terminals of the fuel cell. If there is a need for connecting units of the fuel cell to each other in series, this is achieved by sequentially connecting the terminal 4 of one fuel cell and the terminal 5 of another fuel cell to each other, successively.

Figure 2:
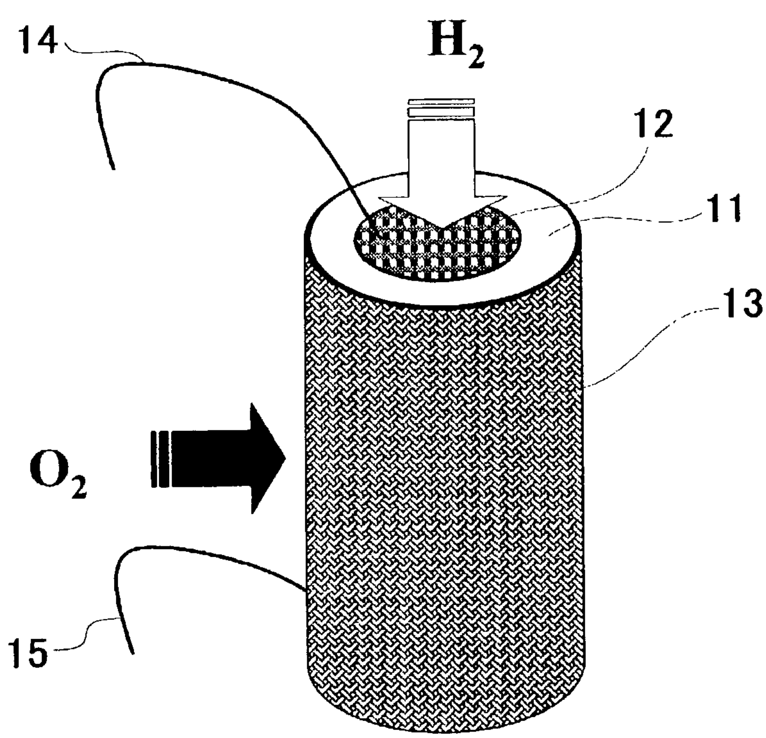
FIG. 2 is a perspective view showing one example of the fuel cell using a gaseous fuel, according to the present invention.

FIG. 2 shows another embodiment of a fuel cell, which is suitable when employing a construction in which the inside of the tube is filled with a gaseous fuel, for example, hydrogen, methanol gas, or the like. Reference numeral 11 denotes a tubular membrane made of a perfluorosulfonic acid-type polymer electrolyte. On the inner and outer sides of the tubular membrane, are provided a layer 12 woven or unwoven into a network structure out of carbon fibers loaded with a platinum/ruthenium alloy (e.g. atomic composition 50:50) as a catalyst, and a layer 13 woven or unwoven into a network structure out of carbon fibers loaded with platinum as a catalyst, respectively. The network of carbon fibers 12 and 13 are fixed to the respective surfaces of the tubular polymer electrolyte membrane by coating or bonding them thereon. Alternatively, when a tubular polymer electrolyte membrane is prepared, that is, when it is being drawn from a molten state and drawn or stretched, the network carbon fibers 12 and 13 may be embedded therein to mold into a layered structure. On this occasion, it is preferred that a porous network tube or nonwoven fabric made of, for example, an insulating polymer or the like be incorporated between the carbon fiber layers 12 and 13 as a spacer so that the carbon fiber layer 12 and the carbon fiber layer 13 do not contact with each other. Inside the tube is introduced hydrogen gas or methanol gas and the carbon fiber layer 12 serves as a catalyst for the fuel electrode. On the outer side of the tube, is fixed the platinum-loaded carbon fiber layer 13, which constitutes an air electrode when it contacts an outside air. Other details are the same as those shown in and described with reference to FIG. 1. That is, external terminals 14 and 15 correspond to those 4 and 5 shown in FIG. 1, respectively.

As another embodiment of the fuel cell of the present invention (not shown), the fuel cell can be made to have the air electrode that is provided on the inner side of the tubular polymer electrolyte membrane, and the fuel electrode that is provided on the outer side of the tubular polymer electrolyte membrane. In this case, the oxidizer (air or oxygen) is made to pass through inside of the tube to contact with the air electrode, and fuel is fed to the outside of the tube, thereby making the fuel cell operate. As the method for feeding the fuel to the fuel electrode, for example, the entire fuel cell is contained in a vessel filled with the fuel, thereby the fuel electrode provided on the outer side of the tubular membrane is brought into contact with the fuel in the vessel, while keeping the state in which the inside of the tube is sealed not to be contaminated with the fuel.

The fuel cell of the present invention is prepared by forming a polymer electrolyte membrane in a tubular form. Making the tubular electrolyte membrane smaller in diameter makes it possible to cope with miniaturization (making it small size). Further, designing the length of tube and thickness of membrane as appropriate, and further connecting the resultant units to each other as appropriate can give rise to cells that can respond to various output powers. Since the inside of the tube is excellent in gas tightness, it is particularly suitable for constructing a fuel electrode. Further, the tubular (hollow) polymer electrolyte membrane not only has excellent flexibility in shape but also retains mechanical strength, so that the issue of how to select the material for a stack raising a problem in designing fuel cell can be solved.

The polymer electrolyte membrane material to be used is not necessarily limited to the above-mentioned perfluorosulfonic acid-type polymer, and it may be selected from a perfluorocarboxylic acid-type membrane, a poly-styrene-vinylbenzene-type membrane, a quaternary ammonium-type anion-exchange membrane, or the like, as appropriate.

Further, for example, a membrane made of benzimidazole-based polymer to which phosphoric acid is doped, and a membrane made of polyacrylic acid impregnated with a concentrated potassium hydroxide solution are also effective, as the electrolyte membrane. In such cases, also for low-temperature operating-type fuel cells, such as phosphoric acid fuel cells and alkali fuel cells, whose operating temperature is about 300° C. or less, use of a tubular electrolyte enables construction of fuel cells, in which the fuel electrode and oxygen electrode are separated to seal each other, and which can be miniaturized (made compact).

The size (outer/inner diameters), length and film thickness of the tubular polymer electrolyte membrane may be set as appropriate depending on the output power required for the fuel cell, an apparatus to which the fuel cell is applied, or the like. For example, the tube has an inner diameter of 0.2 to 10 mm, an outer diameter of 0.5 to 12 mm, and a length of 20 to 1,000 mm. Preferably, it has an inner diameter of 0.3 to 5 mm, an outer diameter of 0.5 to 7 mm, and a length of 30 to 500 mm.

The fuel cell of the present invention has a tubular polymer electrolyte membrane, with a fuel electrode on one of inner and outer sides of the membrane, and with an air electrode on the other side of the membrane, in which catalysts are loaded (carried) on the inner and outer sides of the tubular polymer electrolyte membrane.

In the fuel cell of the present invention, loading of a catalyst on the inner and outer sides of the tubular polymer electrolyte membrane is performed by arranging carbon fibers loaded with the catalyst on the inner side and/or outer side of the tubular polymer electrolyte membrane. This arrangement enables construction of a catalyst layer having excellent electrical conductivity. The carbon fibers laminated on the tubular polymer electrolyte membrane are also effective in retaining the mechanical strength of the cell, so that they can improve the mechanical properties of the fuel cell.

The fuel electrode and air electrode may be provided on any one of the inner and outer sides of the tubular membrane. It is preferred that the fuel electrode is provided on the inner side, and the air electrode is provided on the outer side of the membrane.

The catalysts for fuel electrode and air electrode preferably contains platinum family metals, such as platinum, rhodium, palladium, ruthenium, iridium, and the like, and the combination thereof, and the alloy made of these.

In the case where a catalyst is loaded on the inner side and/or outer side of the tubular polymer electrolyte membrane by arranging carbon fibers loaded with the catalyst thereon, at least one of the above-mentioned catalyst metals is loaded on the carbon fibers, which are then fixed to the inner surface and/or outer surface of the polymer membrane. It is preferred that these catalyst metals be dispersed as fine particles onto a surface of the carbon fiber.

Examples of the carbon fiber include those having flexibility and having an outer diameter of preferably 1 to 100 μm, more preferably 5 to 20 μm. The length of the carbon fiber may be determined appropriately depending on the length of the tubular polymer electrolyte membrane. Examples of the shape of the carbon fiber to be used include a thread- or strand-like form, woven or unwoven network form, fabric-like form, and the like.

As for the arrangement of the carbon fiber, the carbon fiber can be fixed onto the inner and/or outer surface of the polymer electrolyte membrane by coating, cold-bonding or hot-pressing. In the case where the carbon fibers are coated, the carbon fibers are fixed on the wall surface of the tubular electrolyte membrane using a polymer electrolyte solution, and then dried. In the case where the carbon fibers are cold-bonded, the bonding is performed preferably at 10 to 100° C., more preferably at 25 to 85° C. by using a pressing machine or a roller machine, at a pressure of preferably 30 to 100 kg/cm$^2$. In the case where the carbon fiber is thermally bonded, the bonding is performed preferably at 100 to 200° C., more preferably at 120 to 140° C. by using a pressing machine or a roller machine, at a pressure of preferably 1 to 50 kg/cm$^2$. On this occasion, it is preferred that the carbon fiber be impregnated with a polymer electrolyte solution in advance.

Furthermore, the carbon fiber may also be arranged as follows. For example, a catalyst-loaded carbon fibers are filled on the inner side of the tubular membrane. Alternatively, the carbon fibers may be woven or unwoven into a network structure in advance and the network of carbon fibers may be incorporated or embedded onto a polymer when a tubular polymer electrolyte membrane is molded, that is, when the membrane is drawn from the polymer in a molten state and stretched. In the case where the carbon fibers are filled, the carbon fibers are inserted into a nozzle through which a tubular polymer electrolyte membrane is drawn.

The arrangement of the carbon fibers is preferably performed by the above-mentioned method, in which the carbon fibers are woven or unwoven into a network in advance, and when a tubular polymer electrolyte membrane is prepared, the polymer is molded with the network carbon fiber embedded thereon. On this occasion, it is more preferred that the above-mentioned tubular spacer is integrated with the network carbon fiber and the resultant integrated product is embedded onto a molten polymer electrolyte, while drawing and stretching the polymer electrolyte.

As for the method of loading the catalyst for the fuel electrode or air electrode on the side where the catalyst-loading carbon fibers are not fixed, those techniques conventionally used when constructing polymer electrolyte fuel cells and those techniques conventionally used when constructing electrodes for water electrolysis with a polymer electrolyte membrane (see, for example, JP-A-55-38934 ("JP-A" means unexamined published Japanese patent application)), and the like, may be appropriately adopted.

The fuel is brought into contact with the fuel electrode on the inner or outer side of the tubular polymer electrolyte membrane in a gaseous or liquid state. The fuel may be fed continuously, or alternatively it may be filled in a space on the side of the fuel electrode in advance. The oxidizer is brought into contact with the air electrode through the side of the air electrode of the tubular polymer electrolyte membrane. Since the electrolyte is a tubular membrane, the inside of the tube is gas tight and no leakage occurs, so that there is no fear of mixing of the fuel and oxidizer without resort to any special pass (channel), separator, or the like. In addition, arranging (providing) the carbon fiber increases the mechanical strength of the tubular membrane to make it endure a large pressure difference across the membrane, and as a result, control of gas pressure or pressurization can be easily performed.

The fuel cell of the present invention is easy to miniaturize, has high output power density, and operates at a low operation temperature as low as 100° C. or less, so that it is expected to have a long term durability and is easy to handle. From these features, the fuel cell of the present invention can be utilized as a power source in a variety of portable devices such as cellular phones, video cameras, notebook-type personal computers, and the like, as well as it can be utilized also as a portable power source.

According to the present invention, use of carbon fibers loaded with a catalyst in a fuel electrode and/or an air electrode in a fuel cell with a tubular polymer electrolyte membrane enables formation of a high output power fuel cell that can be easily miniaturized, that retains gas tightness of the fuel electrode, that endures a large pressure difference across the membrane, and that also has high mechanical strength and flexibility.

Further, according to the present invention, the problems of leakage of the fuel or occurrence of breakage of the cell can be prevented, since the fuel cell of the present invention utilizing the tubular polymer electrolyte membrane in combination with the carbon fiber has high mechanical strength, flexibility and gas tightness.

Furthermore, according to the present invention, the fuel cell can be provided, in which a fuel such as liquid methanol and the like is incorporated into the fuel electrode without passing through a reformer and can be used as a fuel as it is.

Hereinafter, the present invention will be illustrated in more detail by way of examples and with reference to the attached drawings, but the present invention should not be limited thereto.

EXAMPLE

Example 1

Figure 3:
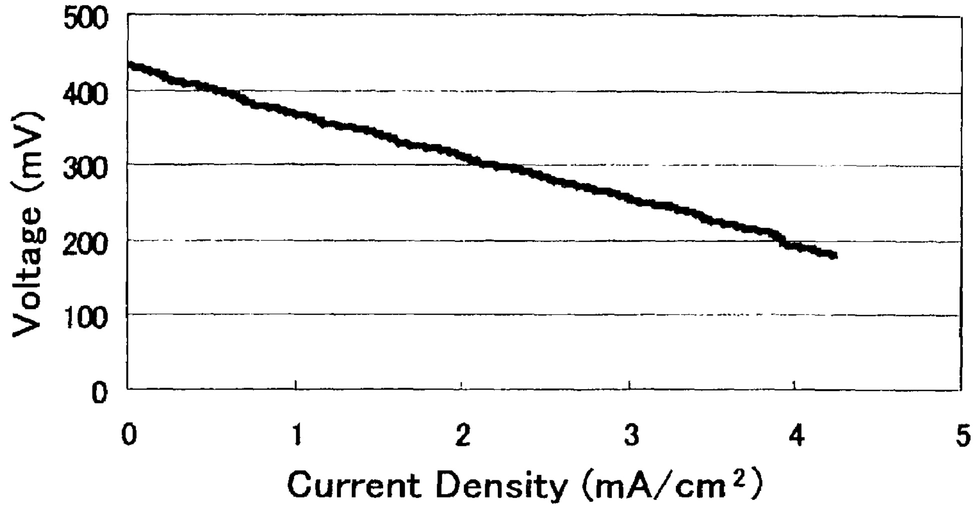
FIG. 3(*a*) is a graph illustrating current-potential characteristics in one example of the fuel cell using a methanol in sulfuric acid solution, according to the present invention.
Figure 3:
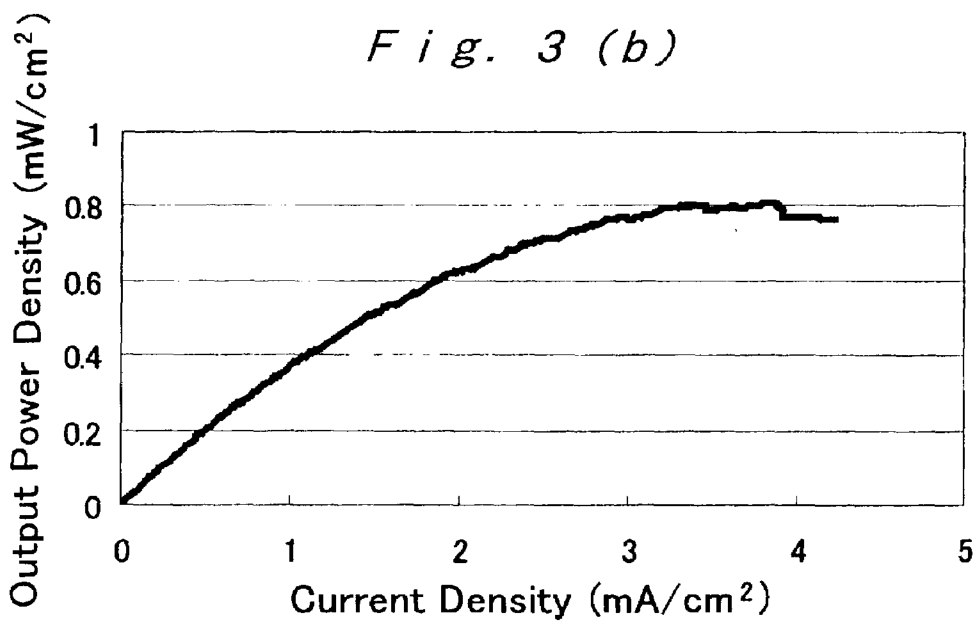

According to the design shown in FIG. 1, a mixed solution of 0.2 M sodium borohydride and 1 M sodium hydroxide was charged inside a tubular electrolyte membrane (1) (trade name of SUNSEP, produced by ASAHI GLASS ENGINEERING Co., Ltd.) having an inner diameter of 0.3 mm, an outer diameter of 0.5 mm and a length of 30 mm, and a 0.1-M aqueous hexachloroplatinic acid solution was contacted with the outer side of the resultant tube, to form a layer (3) of deposited platinum on the outer side of the tube by a chemical plating method. Thereafter, the entire tube was washed with a sulfuric acid solution, and excess unreacted residuals were removed, and at the same time the electrolyte membrane was rendered acid-type. Then, on the surface of carbon fibers having an outer diameter of about 10 $\mu$m (produced by Petoca Materials Ltd., polyacrylonitrile-based), was loaded a tetraammine platinum complex and ruthenium nitrosyl nitrate (atomic composition 50:50), and the resultant carbon fibers were heated at 400° C. in an argon stream, to prepare carbon fibers loaded with 40% by mass of a platinum/ruthenium alloy. The resulting carbon fibers (2) were inserted inside the tube, to construct a fuel cell. A mixed solution of 1-M sulfuric acid and 3-M methanol was injected into the tube by use of a syringe. The carbon fibers (2) for a fuel electrode were connected to an external connection terminal (4), and the platinum deposit layer (3) formed on the outside of the tube for an air electrode was connected to an external terminal (5), thereby constructing a single cell of a direct methanol fuel cell. FIG. 3(*a*) illustrates current-potential characteristics of the thus-obtained single-cell, and FIG. 3(*b*) illustrates current-power characteristics of the single-cell.

Example 2

Figure 4:
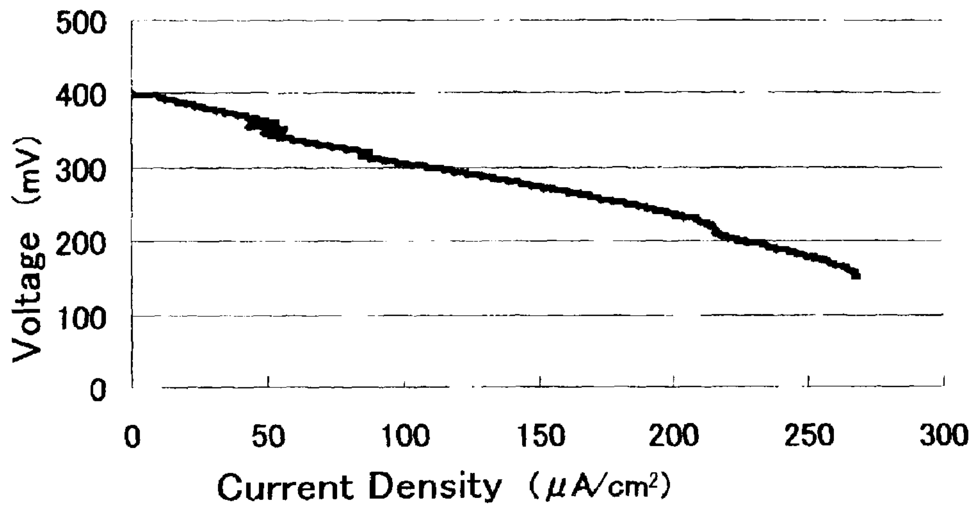
FIG. 4(*a*) is a graph illustrating current-potential characteristics in one example of the fuel cell using methanol in water, according to the present invention.
Figure 4:
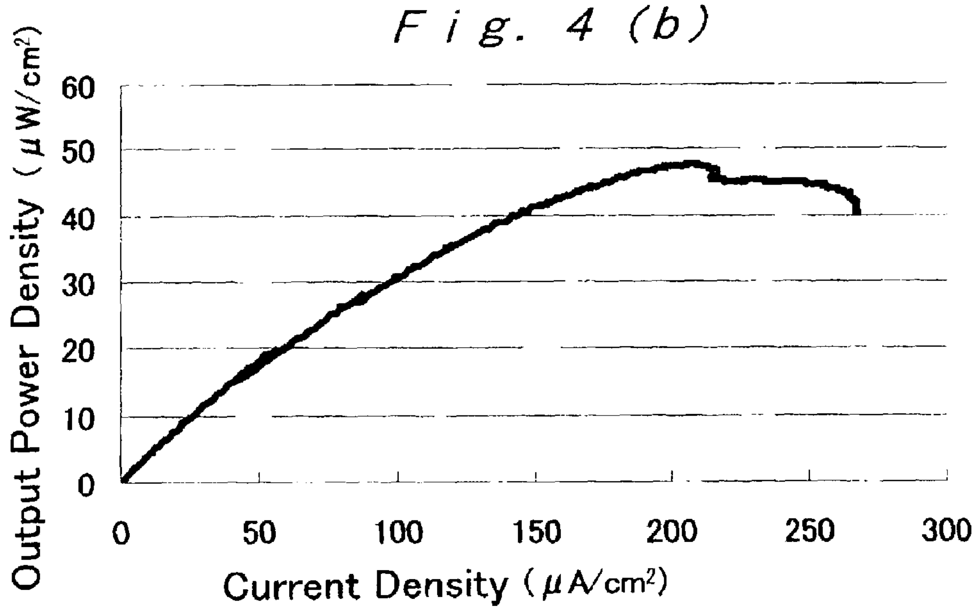

In the same manner as in Example 1, a single cell of a direct methanol fuel cell having the platinum/ruthenium-loaded carbon fibers (2) inserted inside the tubular electrolyte membrane (1) was constructed. 1-M Methanol was injected in the tube by use of a syringe. The carbon fibers (2) for use as a connection terminal of a fuel electrode, and the platinum deposit layer (3), which was formed on the outside of the tube (1), for use as a connection terminal of an air electrode, were connected respectively, to external terminals (4) and (5), to construct a cell. FIG. 4(*a*) shows current-potential characteristics and FIG. 4(*b*) shows current-output power characteristics of the fuel cell obtained in the above.

From the results shown in FIGS. 3(*a*) and 3(*b*) and FIGS. 4(*a*) and 4(*b*), it can be seen that the fuel cell of the present invention has catalyst layers having excellent electroconductivity and can realize high cell output power.

Having described our invention as related to the present embodiments, it is our intention that the invention should not be limited by any of the details of the description, unless otherwise specified, but rather be construed broadly within its spirit and scope as set out in the accompanying claims.

What is claimed is:

1. A fuel cell, comprising (a) a tubular polymer electrolyte membrane having an inner side and an outer side, with a fuel electrode provided on the inner side of the membrane, and with an air electrode provided on the outer side of the membrane, (b) at least one of the fuel electrode and the air electrode consists essentially of carbon fibers having surface on which a catalyst is loaded, (c) the remaining electrode consists essentially of a catalyst, wherein said fuel cell is hollow or has a cavity where methanol is introduced as a fuel to be supplied to the fuel electrode without passing through any reformer; and the hollow fuel cell or fuel cell cavity has a diameter in the range of from 0.2 to 10 mm, an outer diameter of the cell is in the range of 0.5 to 12 mm, and a length of the cell is in the range of from 20 to 500 mm, whereby an output power is obtained by virtue of the methanol fuel supplied into the hollow fuel cell or fuel cell cavity.

2. The fuel cell according to claim 1, wherein the carbon fibers loaded with a catalyst are hot-pressed at a pressure in the range of from 1 to 50 kg/cm$^2$ and at a temperature in the range of from 100 to 200° C. to the tubular polymer electrolyte membrane.

3. The fuel cell according to claim 1, wherein the carbon fibers loaded with a catalyst are coated onto a surface of the tubular polymer electrolyte membrane.

4. The fuel cell according to claim 1, wherein the carbon fibers loaded with a catalyst being preliminarily woven or unwoven into a fabric and made into a cylindrical form are incorporated into a surface of the tubular polymer electrolyte membrane.

5. The fuel cell according to claim 1, wherein said fuel cell is utilized as a power source of a portable device.

6. The fuel cell according to claim 1, wherein the fuel cell is flexible by utilizing the combination of the carbon fiber electrode and the tubular polymer electrolyte membrane, and thereby the fuel cell accommodates to an apparatus.

7. The fuel cell according to claim 1, wherein said fuel cell operates at a temperature of 100° C. or less.

8. The fuel cell according to claim 1, wherein said fuel cell is suitable as a power source in a cellular phone, video camera, or notebook personal computer.

9. The fuel cell according to claim 1, wherein the tubular polymer electrolyte membrane is flexible.

* * * * *